Oct. 6, 1953          B. J. MURPHY          2,654,614

RESILIENT VEHICLE SUSPENSION

Filed Sept. 16, 1950          2 Sheets—Sheet 1

Inventor
Bernard J. Murphy
by
Attorney

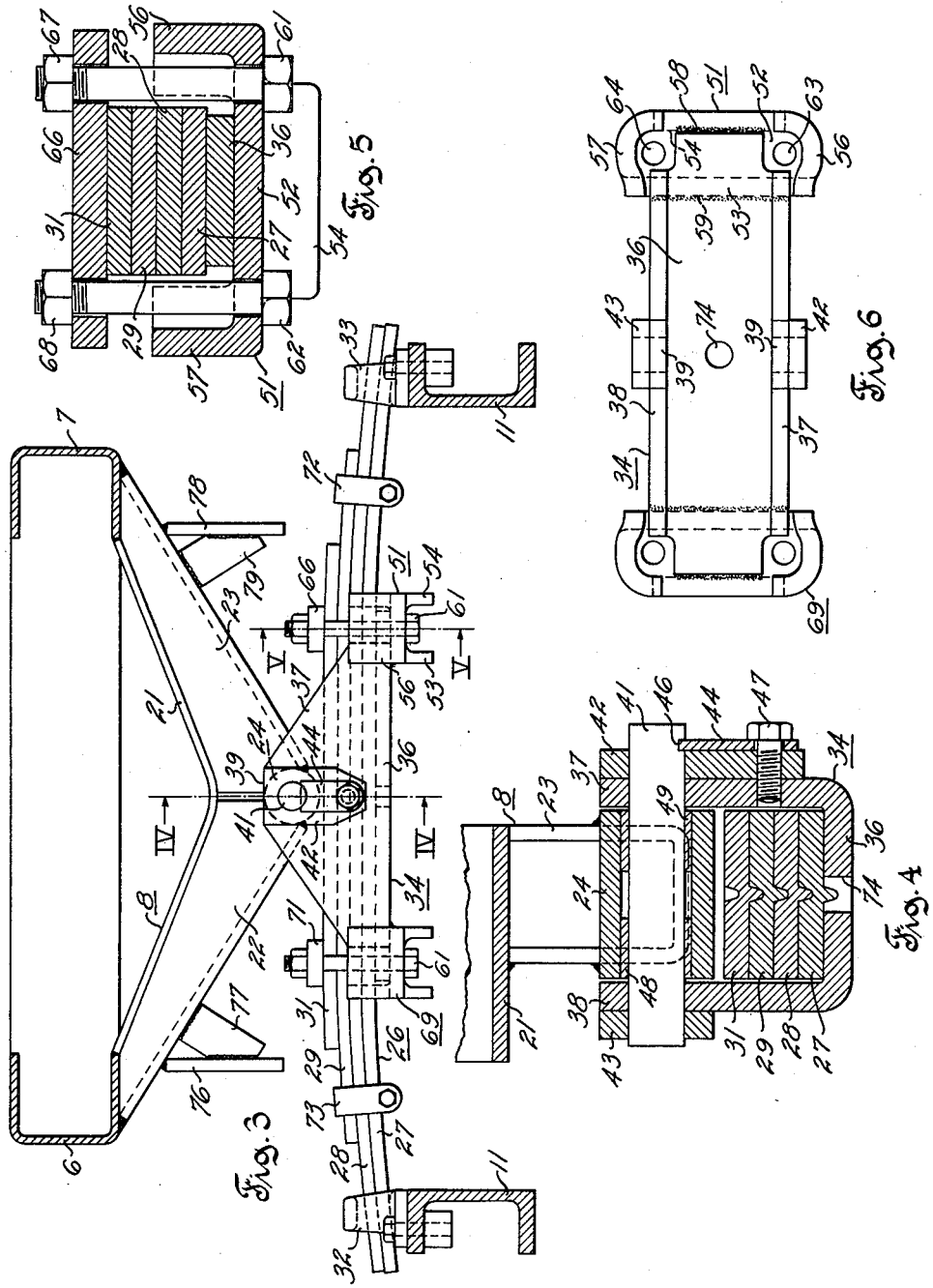

Patented Oct. 6, 1953

2,654,614

UNITED STATES PATENT OFFICE 2,654,614

RESILIENT VEHICLE SUSPENSION

Bernard J. Murphy, Springfield, Ill., assignor to Allis-Chalmers Manufacturing Company, Milwaukee, Wis.

Application September 16, 1950, Serial No. 185,260

6 Claims. (Cl. 280—104)

The invention relates to vehicle suspensions, that is, to structures by means of which the body of a vehicle is supported on its running gear.

In crawler tractors of the three point suspension type, it has heretofore been usual to pivot a pair of track frames on a horizontal axis at the rear end of the tractor main body, and to stabilize the main body on the track frames by means of a vertically resilient cross member or equalizer which rests at its opposite ends on the track frames and which has a central pivot connection with the main body forwardly of said horizontal axis. The resilient equalizer usually comprises a horizontally laminated spring at the under side of the tractor main body, the spring having a lower main leaf which bridges the space between the track frames, and auxiliary leaves on top of the main leaf. The vertical downward load of the tractor main body is usually transmitted to the spring by means of a saddle which bears directly upon the top leaf of the spring, and by means of a pivot pin which connects the saddle with the tractor main body and permits transverse rocking movement of the spring and saddle relative to the tractor main body. In order to transmit upward rebound loads from the main body to the track frames the saddle must be connected with the lower leaf, and for that purpose the saddle usually has or is tied to an upward thrust transmitting member underlying the main leaf.

A reverse arrangement of the spring and saddle has also been suggested, in which the saddle is arranged under the main leaf and is tied to the top leaf by means of a pair of inverted U-bolts, so that the downward load of the main body is indirectly transmitted from the saddle to the top leaf of the spring. In such reverse arrangement of the spring and saddle as heretofore suggested, the saddle is pivoted on depending bracket arms of the main body for transverse rocking movement on an axis underlying the main leaf of the spring.

The horizontal span between the track frames is usually large and necessitates a spring of relatively great length; and on the other hand, the vertical loads to which the equalizer becomes subjected in operation of the tractor are usually heavy and require a spring of considerable load carrying capacity. The available space for mounting the equalizer under the tractor main body is usually limited by ground clearance requirements, necessitating vertical compactness of the equalizer and of its mounting under the tractor main body. For assembly and service purposes, it is desirable that the pivot mounting of the equalizer on the main body be readily accessible from below; and for reasons of economy, the equalizer should be so constructed as to permit manufacture at a minimum of costs for labor and material and with conventional shop equipment.

The foregoing requirements are believed to have not all been taken care of in an entirely satisfactory manner by the prior art structures which have been outlined hereinbefore; and the principal object of the present invention is to provide an improved crawler tractor which will be entirely satisfactory with respect to a three point suspension of its main body on the track frames, and more particularly with respect to the construction and mounting of the equalizer by means of which the main body of the tractor is stabilized on the track frames.

Another object of the invention is to provide an improved equalizer for establishing a vertically yieldable load transmitting connection between body and running gear structures of a vehicle.

More specifically, it is an object of the invention to provide an improved equalizer of the type mentioned hereinbefore which functions to transmit vertical loads indirectly from a pivotally mounted saddle to the last auxiliary leaf of a horizontally laminated spring, as distinguished from those equalizers in which a pivotally mounted saddle bears directly upon the last auxiliary leaf the the spring.

Another object of the invention is to provide an improved equalizer of the specific type set forth hereinabove, which is sturdy, simple and compact, and which lends itself to manufacture at a minimum of costs for labor and material and with conventional shop equipment.

The foregoing and other objects and advantages are attainted by the present invention, various novel features of which will be apparent from the description herein and the accompanying drawings disclosing an embodiment of the invention, and will be more particularly pointed out in the appended claims.

Referring to the drawings:

Fig. 3 is a view on line III—III of Fig. 1 showing an equalizer and associated parts in elevation, and parts of the main and track frames in section;

Fig. 4 is a section on line IV—IV in Fig. 3;

Fig. 5 is a section on line V—V in Fig. 3; and

Fig. 6 is a top view of a channel bar forming part of the equalizer shown in Fig. 3.

Figure 2:
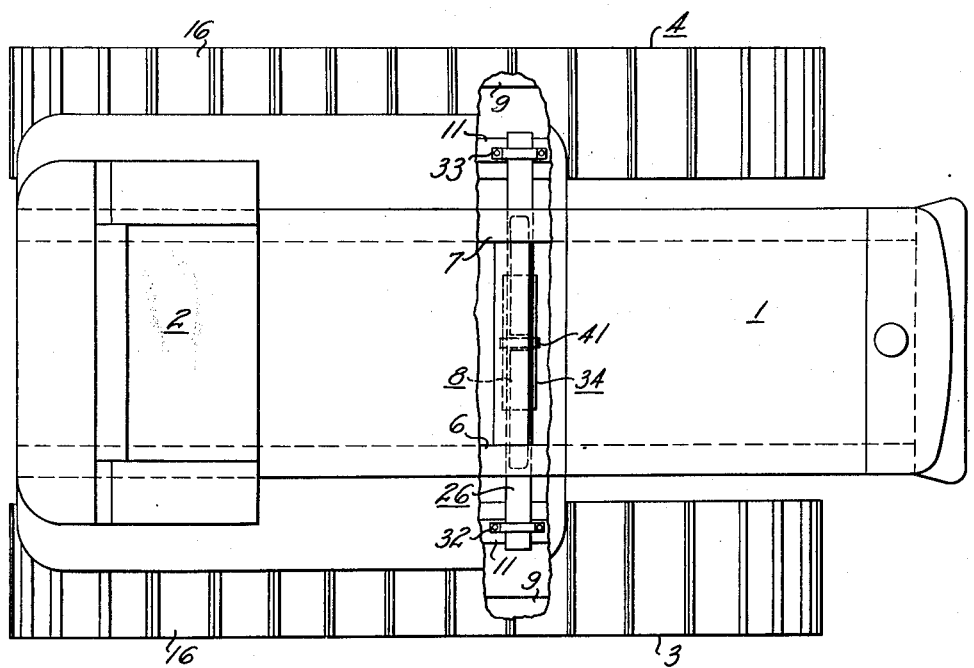
Fig. 2 is a top view of the tractor shown in Fig. 1, part of the superstructure and of the track belts being broken away for purposes of exposure.
Figure 1:
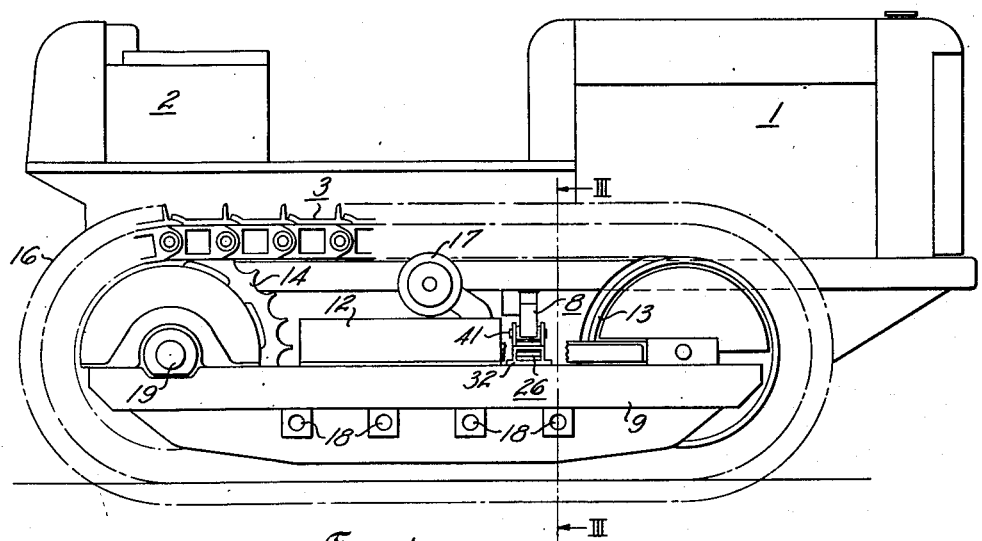
Fig. 1 is a side view of a crawler tractor of the three point suspension type.

The side and top views of the tractor shown in Figs. 1 and 2 are somewhat diagrammatic to generally indicate a main tractor body with a power plant 1 at the front and an operator's seat and fuel tank assembly 2 at the rear; and two self-laying track units 3 and 4 at the opposite sides of the main body.

A frame structure of the main body comprises side channels 6 and 7, and a V-shaped hanger 8 (Fig. 3) at approximately equal horizontal distances from the front and rear ends of the main body, as shown in Figs. 1 and 2. The self-laying track units 3 and 4 are of conventional construction, each including an outer track frame channel 9, an inner track frame channel 11 (Fig. 2), a recoil spring housing 12, a front idler 13, a rear drive sprocket wheel 14, an endless track belt 16, a support roller 17, and track rollers, not shown, journaled on shafts 18. The track unit 3 has a rearward pivot connection of conventional construction, generally indicated at 19 in Fig. 1, with the tractor main body, which permits up and down swinging movement of the track frame of the unit 3 relative to the tractor main body, and the track unit 4 at the other side of the main body has a similar pivot connection not shown. In accordance with accepted practice, the pivot connections include suitable bracing arms, not shown, which prevent toeing in and out and lateral tilting of the track frames.

Referring to Figs. 3 and 4, the V-shaped hanger 8 is constructed in the form of hollow plate metal structure and comprises a top plate 21 which is bent into V-shape, and two U-shaped plate members 22 and 23 which are welded along the edges of their flanges to the under side of the top plate and increase in depth toward the apex of the hanger. The left half of the top plate 21 in Fig. 3, together with the U-shaped plate member 22, and the right half of the top plate 21 together with the U-shaped plate member 23 form upwardly diverging box-section arms of the hanger, and these arms are rigidly secured at their outer ends, to opposite side portions of the main body of the tractor. As shown in Fig. 3, the top plate 21 and the U-shaped plate member 22 are welded at the outer end of the hanger arm at the left of Fig. 3 to the side frame channel 6 of the tractor main body, and the top plate 21 and the U-shaped plate member 23 are welded at the outer end of the hanger arm at the right of Fig. 3 to the side frame channel 7 of the tractor main body.

Rigidly secured to the apex portion of the hanger 8 is a bearing sleeve 24 which is somewhat longer than the distance between the front and rear faces of the hanger, as shown in Fig. 4, one end of the bearing sleeve projecting beyond the front face of the hanger at the right of Fig. 4, and the other end of the sleeve projecting beyond the rear face of the hanger at the left of Fig. 4. In order to provide a secure connection and rigid mounting of the bearing sleeve 24 on the hanger 8, the relatively adjacent lower corner portions of the U-shaped plate members 22 and 23 are cut out to form an upwardly recessed seat for the sleeve 24 on the vertical flanges of the U-shaped plate members 22 and 23 at the forward side of the hanger, and to form another upwardly recessed seat for the sleeve 24 on the vertical flanges of the U-shaped plate members 22 and 23 at the rearward side of the hanger. The bearing sleeve 24 is secured on the hanger by welded seams along the edges of the forward and rearward seats, and preferably also by longitudinal welded seams along the lower web edges of the plate members 22 and 23 at opposite sides of the bearing sleeve.

The equalizer for stabilizing the main body of the tractor on the track units is constructed and mounted as follows. A horizontally laminated leaf spring, generally designated by the reference character 26, comprises two main leaves 27 and 28 of equal length, an auxiliary leaf 29 of shorter length than the main leaves and resting on top of the main leaf 28, and another auxiliary leaf 31 of shorter length than the leaf 29 and resting on top of the latter. The main leaf 27 forms the lower of the vertically opposite sides of the spring 26, and the auxiliary leaf 31 forms the upper of the vertically opposite sides of the spring 26. The main leaf 27 rests at its opposite ends on spring seats 32 and 33 which are mounted on the inner side channels 11 of the track units 3 and 4, respectively. In other words, the main leaf 27 is adapted for connection at its opposite ends in vertical load transmitting relation with the running gear structure of the tractor. In conformity with conventional practice, each of the spring seats 32 and 33 forms a rectangular loop to limit upward movement of the main leaves of the spring 26 relative to the track frames, the opposite ends of both main leaves 27 and 28 extending through the loops of the spring seats 32 and 33, respectively, as shown in Fig. 3.

A rigid channel bar, generally designated by the reference character 34, has a longitudinal web 36 adjacent to and in upward load transmitting relation with the under side of the main leaf 27, and longitudinal flanges 37 and 38 at the horizontally opposite sides, respectively, of the spring 26. Each of the flanges 37 and 38 comprises a substantially triangular plate member which is joined at its base with the web 36 and has an apex portion 39 projecting vertically beyond the vertically upper side of the spring 26. In other words, each of the flanges 37 and 38 has a vertically extended portion intermediate the longitudinally opposite ends of the channel bar 34, and such vertically extended portion of each flange projects beyond the upper side of the spring 26.

Referring to Fig. 4, the bearing sleeve 24 on the hanger 8 extends transversely of and in upwardly spaced relation to the top leaf 31 of the spring 26, in the space between the vertically extended portions of the flanges 37 and 38. A pivot pin 41 extends through the vertically extended flange portions of the channel bar and through the bearing sleeve 24 and is operative to mount the channel bar 34 on the tractor main body for rocking movement transversely of said main body. For purposes of mounting the pivot pin 41 on the channel bar, a block 42 and a boss 43 are welded to the front and rear faces, respectively, of the channel bar, and bores for the reception of the pivot pin 41 are formed by drilling holes through the block 42, flanges 37, 38 and boss 43. A retainer plate 44 engages a tangential slot 46 of the pivot pin at the forward end of the latter and is secured to a lower portion of the block 42 by a cap screw 47, engagement of the plate 44 with the tangential slot 46 securing the pivot pin 41 in nonrotatable and axially fixed relation to the channel bar 34. To minimize friction, a pair of axially spaced self-lubricating bushings 48 and 49 are operatively interposed between the pivot pin 41 and the bearing sleeve 24.

Referring to Figs. 4 and 6, the channel bar 34 is formed in a simple and economical manner by cutting a suitable blank from plate metal stock and then bending the blank into U-shape, which may be done with conventional shop equipment. As best shown in Fig. 6, the web 36 of the channel bar projects longitudinally, at its opposite ends, beyond the flanges 37 and 38.

As shown in Fig. 3, two clamping structures at the longitudinally opposite ends of the channel bar tie the spring 26 to the channel bar 34 so that vertical downward load of the tractor main body will be transmitted from the channel bar to the top leaf 31 through the clamping structures. In other words, the vertical downward load of the tractor main body which acts upon the pivot pin 41, passes downwardly from the opposite ends of the pin through flanges 37 and 38 to the bottom part of the channel bar and then upwardly through the clamping structures to the top leaf 31 of the spring. As distinguished from conventional structures in which the vertical downward load of the tractor main body passes directly to the top leaf of the equalizer spring, the herein disclosed equalizer functions to transmit said load indirectly, that is through the clamping structures, to the top leaf of the spring, rather than directly from the upper apex portions of the flanges 37, 38 to the adjacent intermediate part of the top leaf 31. The relatively great depth of the channel bar at the critical region between its longitudinally opposite ends renders the channel bar adequately strong to perform its described load transmitting function, and the amount of material required to afford the necessary vertical stiffness of the channel bar is small, with resulting savings of cost and weight. The location of the axis of the pivot pin 41 at the upper side of the spring 26, rather than at the lower side, is desirable for ground clearance purpose. Further, the location of the bearing sleeve 24 in the space between the apex portions of the channel flanges 37 and 38 permits use of a relatively short pivot pin and affords a desirable horizontal compactness, as compared with a construction in which the equalizer bar is straddled by a pair of bracket arms depending from the main body at the front and rear sides, respectively, of the equalizer bar.

Referring to the clamping structure which is shown at the right end of the channel bar 34 in Fig. 3, and which is also shown in section in Fig. 5, a yoke generally designated by the reference character 51 extends in the direction of its length transversely of the channel bar and has opposite end portions projecting from the channel web 36 at the horizontally opposite sides, respectively, of the channel bar. A plate 52 which forms the beam part of the yoke is reinforced at its under side by a pair of ribs 53 and 54 (Fig. 3) which extend longitudinally of the yoke in transversely spaced relation to each other, and flanges 56 and 57 extend upwardly from the plate 52 at the longitudinally opposite ends of the latter. The channel bar 34 extends into the space between the flanges 56 and 57 of the yoke 51, as best shown in Fig. 6. The major part of the plate 52 underlies the web 36 of the channel bar 34, and an edge part of the plate 52 above the rib 54 projects beyond the end edge 58 of the web 36.

The yoke 51 is formed separately from the channel bar 34, as by casting or forging, and the yoke is rigidly secured to the channel bar by a welded seam along the edge 58 of the channel web 36, and by another welded seam along the longitudinal edge 59 of the plate 52 at the under side of the channel bar 34.

A pair of bolts 61 and 62 are passed upwardly through holes 63 and 64 (Fig. 6) of the yoke plate 52, and extend vertically beyond the top leaf 31 of the spring 26 at the forward and rearward sides of the latter. At the upper side of the top leaf 31 a thrust plate 66 extends across the spring 26 and has two holes in vertical alignment with the holes 63 and 64 of the yoke 51. The shanks of the bolts 61 and 62 extend upwardly through the holes of thrust plate 66 and the latter is pulled down upon the top leaf 31 of the spring by means of nuts 67 and 68 on the threaded shanks of the bolts 61 and 62.

The clamping structure at the left end of the channel bar 34 in Fig. 3 is constructed and functions in the same manner as the clamping structure at the right. It comprises a yoke 69, a thrust plate 71 and a pair of tie bolts, these parts being exact duplicates of the corresponding parts of the clamping structure at the right in Fig. 3.

Conventional spring clips 72 and 73 are mounted on the spring 26 to tie the main leaves 27 and 28 and the auxiliary leaf 29 together at points beyond the ends of the top leaf 31. The oppositely extending portions of the top leaf 31 which are engaged by the clamping structures, that is, by the thrust plates 66 and 71, are exposed by the flanges 37 and 38 of the channel bar 34, that is, the clamping structures bear upon oppositely extending portions of the top leaf 31 which project from the space between the channel flanges 37 and 38.

Referring to Fig. 4, the leaves of the spring 26 are interlocked against longitudinal displacement relative to each other by conventional nibs and dents which are formed at the center portions of the leaves, and the web 36 of the channel bar 34 has a hole 74 to accommodate the nib of the main leaf 27 and thereby insure full surface contact of the lower side of the main leaf 27 with the upper side of the web 36 throughout the length of the latter when the nuts on the bolts of the clamping structures are tightened down upon the thrust plates 66 and 71.

In order to limit transverse rocking movement of the equalizer, that is, of the spring and channel assembly 26, 34, relative to the tractor main body, a pair of stops are secured to and depend from the diverging arms, respectively, of the V-shaped hanger 8 in overlying relation to the spring 26, these stops being cooperable, respectively, with portions of the spring at opposite sides of the pivot pin 41. The stop which is secured to the hanger arm at the left of Fig. 3 comprises a vertical, rectangular bumper plate 76 which is welded along its upper edge to the under side of the U-shaped plate member 22, and an inclined plate metal brace 77 which is welded to the inner side of the bumper plate 76 and to the under side of the U-shaped plate member 22. The other stop which is secured to the hanger arm at the right of Fig. 3, comprises a bumper plate 78 and a brace 79, these parts being duplicates of and mounted in the same manner as the corresponding parts of the stop at the left in Fig. 3.

It will be noted that the bumper plates 76 and 78 are located in desirably close relation to the side channels 6 and 7, respectively, of the main body. Upward swinging movement of the track unit 3 at the near side of the tractor in Fig. 1 is limited by contact of the auxiliary leaf 29 with the lower edge of the bumper plate 76 at the left of Fig. 3, and the incident upward thrust load on the bumper plate 76 passes in a substantially vertical direction to the frame channel 6 which in part lies vertically above the bumper plate 76.

Upward swinging movement of the track unit 4 at the far side of the tractor in Fig. 1 is limited by contact of the auxiliary leaf 29 with the lower edge of the bumper plate 78 at the right of Fig. 3, and the explanations hereinbefore with respect to the coaction of the spring 26 and bumper plate 76, and with respect to the transmission of vertical upward thrust load from the bumper plate 76 to the frame channel 6, analogously apply to the coaction between the spring 26 and the bumper plate 78, and to the transmission of vertical upward thrust load from the bumper plate 78 to the frame channel 7.

It should be understood that it is not intended to limit the invention to the hereinabove described forms and details, and that the invention includes such other forms and modifications as are embraced by the scope of the appended claims.

It is claimed and desired to secure by Letters Patent:

1. An equalizer for establishing a vertically yieldable load transmitting connection between body and running gear structures of a vehicle, said equalizer comprising: a horizontally laminated spring, a main spring leaf forming one of the vertically opposite sides of said spring and adapted for connection at its opposite ends in vertical load transmitting relation with one of said structures, an auxiliary spring leaf forming the other of the vertically opposite sides of said spring; a rigid channel bar having a web adjacent to said one side of said spring, and flanges extending vertically at the horizontally opposite sides, respectively, of said spring; a pivot element cooperable in upward and downward load transmitting relation with a complementary vertical load transmitting element on the other of said structures, said pivot element being mounted on said flanges of said channel bar, in spaced relation to and independently of said spring, at said other of the vertically opposite sides of said spring and intermediate the opposite ends of said channel bar; and vertical load transmitting means mounted on said channel bar, independently of said pivot element, and bearing upon said auxiliary leaf at the other of said vertically opposite sides of said spring.

2. An equalizer for establishing a vertically yieldable load transmitting connection between body and running gear structures of a vehicle, said equalizer comprising a horizontally laminated spring, a main spring leaf forming one of the vertically opposite sides of said spring and adapted for connection at its opposite ends in vertical load transmitting relation with one of said structures, an auxiliary spring leaf forming the other of the vertically opposite sides of said spring, a rigid channel bar having a longitudinal web adjacent to and in vertical load transmitting relation with said one side of said spring, and longitudinal flanges at the horizontally opposite sides, respectively, of said spring, each of said flanges having a vertically extended portion intermediate the longitudinally opposite ends of said channel bar and projecting beyond said other of the vertically opposite sides of said spring, a pivot pin extending transversely of said channel bar and connected independently of said spring with said vertically extended flange portions, said pivot pin being adapted for connection in vertical load transmitting relation with a complementary vertical load transmitting element on the other of said structures, and vertical load transmitting means independent of said pivot pin, bearing upon said auxiliary leaf at said other of the vertically opposite sides of said spring and operatively connected with said channel bar at said longitudinally opposite ends, respectively, of the latter.

3. An equalizer for establishing a vertically yieldable load transmitting connection between body and running gear structures of a vehicle, said equalizer comprising a horizontally laminated spring, a main spring leaf forming one of the vertically opposite sides of said spring and adapted for connection at its opposite ends in vertical load transmitting relation with one of said structures, an auxiliary spring leaf forming the other of the vertically opposite sides of said spring, a rigid channel bar having a longitudinal web adjacent to and in vertical load transmitting relation with said one side of said spring, and longitudinal flanges at the horizontally opposite sides, respectively, of said spring, each of said flanges comprising a substantially triangular plate member joined at its base with said web and having an apex portion projecting beyond said other of the vertically opposite sides of said spring; a pivot pin mounted independently of said spring in openings of said apex portions and adapted for connection in vertical load transmitting relation with a complementary vertical load transmitting element on the other of said structures, said auxiliary leaf having oppositely extending portions projecting from the space between said flanges of said channel bar; and vertical load transmitting means, independent of said pivot pin, bearing upon said oppositely extending portions, respectively, of said auxiliary leaf at said other of the vertically opposite sides of said spring, and operatively connected, respectively, with said channel bar at the longitudinally opposite ends of the latter.

4. An equalizer for establishing a vertically yieldable load transmitting connection between body and running gear structures of a vehicle, said equalizer comprising: a horizontally laminated spring, a main spring leaf forming one of the vertically opposite sides of said spring and adapted for connection at its opposite ends in vertical load transmitting relation with one of said structures, an auxiliary spring leaf forming the other of the vertically opposite sides of said spring; a rigid plate metal channel having a longitudinal web adjacent to and in vertical load transmitting relation with said main spring leaf at said one side of said spring, and longitudinal flanges at the horizontally opposite sides, respectively, of said spring; each of said flanges comprising a substantially triangular plate member joined at its base with said web and having an apex portion projecting vertically beyond said other of the vertically opposite sides of said spring and exposing oppositely extending portions of said auxiliary spring leaf; a pair of yokes formed separately from said channel and integrally connected, respectively, with longitudinally opposite end portions of said web, each of said yokes extending transversely of said channel and having opposite end portions projecting from said web at the horizontally opposite sides, respectively, of said channel; two clamping structures, one bearing upon one of the exposed end portions of said auxiliary leaf at said other of the vertically opposite sides of said spring and operatively connected with said projecting end portions of one of said yokes, and the other of said clamping structures bearing upon the other of the exposed end portions of said auxiliary leaf at said other of the vertically opposite sides of said spring and operatively connected with said projecting end portions of the other of said yokes; and pivot means mounted independently of said spring and clamping structures on said apex portions of said flanges for connecting said channel in vertical load transmitting relation with the other of said body and running gear structures.

5. An equalizer for establishing a vertically yieldable load transmitting connection between body and running gear structures of a vehicle, said equalizer comprising a horizontally laminated spring, a main spring leaf forming one of the vertically opposite sides of said spring and adapted for connection at its opposite ends in vertical load transmitting relation with one of said structures, an auxiliary spring leaf forming the other of the vertically opposite sides of said spring, a rigid channel bar having a longitudinal web adjacent to and in vertical load transmitting relation with said one side of said spring, and longitudinal flanges at the horizontally opposite sides, respectively, of said spring, each of said flanges having a vertically extended portion intermediate the longitudinally opposite ends of said channel bar and projecting beyond said other of the vertically opposite sides of said spring, a pivot pin extending transversely of said channel bar and connected at its opposite ends independently of said spring with said vertically extended flange portions, said pivot pin having a cylindrical portion intermediate said flange portions for reception by a sleeve member on the other of said structures, and vertical load transmitting means independent of said pivot pin, bearing upon said auxiliary leaf at said other of the vertically opposite sides of said spring and operatively connected with said channel bar at said longitudinally opposite ends, respectively, of the latter.

6. An equalizer as set forth in claim 5, and further comprising means connected with one of said flanges in cooperative engagement with said pivot pin for securing said pivot pin in nonrotatable and axially fixed relation to said channel bar.

BERNARD J. MURPHY.

References Cited in the file of this patent

UNITED STATES PATENTS

| Number | Name | Date |
|---|---|---|
| 305,643 | Thompson | Sept. 23, 1884 |
| 513,765 | Crane | Jan. 30, 1894 |
| 1,503,615 | Turnbull | Aug. 5, 1924 |
| 2,049,858 | Norelius et al. | Aug. 4, 1936 |
| 2,233,627 | McDonald | Mar. 4, 1941 |